(12) United States Patent
Dlala et al.

(10) Patent No.: US 11,535,097 B2
(45) Date of Patent: Dec. 27, 2022

(54) MOTOR COOLING SYSTEM UTILIZING AXIAL COOLANT CHANNELS

(71) Applicant: Atieva, Inc., Newark, CA (US)

(72) Inventors: Emad Dlala, Pleasanton, CA (US); Jeremy Mayer, Mountain View, CA (US); Barnaby James Gerard Lewis, Atherton, CA (US); Mohammed Mahmoudi, Edmonton (CA)

(73) Assignee: Atieva, Inc., Newark, CA (US)

( * ) Notice: Subject to any disclaimer, the term of this patent is extended or adjusted under 35 U.S.C. 154(b) by 260 days.

(21) Appl. No.: 16/871,215

(22) Filed: May 11, 2020

(65) Prior Publication Data

US 2021/0347245 A1 Nov. 11, 2021

(51) Int. Cl.
*H02K 9/19* (2006.01)
*B60K 11/02* (2006.01)

(52) U.S. Cl.
CPC ............... *B60K 11/02* (2013.01); *H02K 9/19* (2013.01)

(58) Field of Classification Search
CPC .. H02K 5/20; H02K 5/02; H02K 5/04; H02K 5/08; H02K 9/16; H02K 9/19; H02K 9/18; H02K 9/197; H02K 9/20; H02K 9/06; H02K 9/14; H02K 9/00; H02K 9/08; H02K 9/10; H02K 9/12; H02K 9/22; H02K 9/11; H02K 9/24; H02K 1/20
See application file for complete search history.

(56) References Cited

U.S. PATENT DOCUMENTS

| | | |
|---|---|---|
| 890,577 A | 6/1908 | Richards |
| 1,448,700 A | 3/1923 | Seidner |
| 2,975,309 A | 3/1961 | Seidner |
| 3,675,056 A | 7/1972 | Lenz |
| 4,182,966 A | 1/1980 | Mishra |
| 5,189,325 A | 2/1993 | Jarczynski |
| 5,473,207 A | 12/1995 | Hopeck |
| 5,678,760 A | 10/1997 | Muso |
| 5,859,482 A | 1/1999 | Crowell et al. |
| 6,268,668 B1 | 7/2001 | Jarczynski |
| 6,300,693 B1 | 10/2001 | Poag |
| 6,323,613 B1 | 11/2001 | Hara |
| 6,954,010 B2 | 10/2005 | Rippel et al. |
| 7,009,317 B2 | 3/2006 | Cronin et al. |

(Continued)

FOREIGN PATENT DOCUMENTS

| | | |
|---|---|---|
| EP | 2463991 A2 | 6/2012 |
| JP | 2009240113 A | 10/2009 |

OTHER PUBLICATIONS

International Search Report and Written Opinion for PCT Application No. PCT/US2021/070525, dated Aug. 6, 2021, 9 pages.

(Continued)

*Primary Examiner* — Bryan R Perez
(74) *Attorney, Agent, or Firm* — Brake Hughes Bellermann LLP

(57) ABSTRACT

An electric motor cooling system is provided that utilizes stator-integrated axial coolant channels and a coolant manifold centrally located within the stator to efficiently remove motor assembly heat. In order to increase the velocity of the coolant exiting the axial coolant channels, thereby improving end winding cooling uniformity, end laminations are integrated into the stator which restrict the flow of coolant from the axial coolant channels.

14 Claims, 17 Drawing Sheets

(56) References Cited

U.S. PATENT DOCUMENTS

| | | |
|---|---|---|
| 7,397,154 B2 | 7/2008 | Tilton et al. |
| 7,633,194 B2 | 12/2009 | Dawsey et al. |
| 7,851,966 B2 | 12/2010 | Rippel |
| 8,629,585 B2 | 1/2014 | Bradfield |
| 9,755,482 B2 | 9/2017 | Raczek |
| 9,831,746 B2 | 11/2017 | Maki-Ontto et al. |
| 10,128,701 B2 * | 11/2018 | Dlala .................... B60K 11/02 |
| 10,158,263 B2 * | 12/2018 | Dlala ...................... H02K 9/19 |
| 2007/0138878 A1 | 6/2007 | Down et al. |
| 2008/0100159 A1 | 5/2008 | Dawsey et al. |
| 2012/0161556 A1 | 6/2012 | Mizutani |
| 2012/0256503 A1 | 10/2012 | Le Besnerais |
| 2012/0274159 A1 | 11/2012 | Le Besnerais |
| 2012/0286597 A1 | 11/2012 | Gundtoft |
| 2015/0115753 A1 * | 4/2015 | Koga ...................... H02K 9/12 |
| | | 310/64 |
| 2015/0222151 A1 | 8/2015 | Semken |
| 2015/0280525 A1 | 10/2015 | Rippel et al. |
| 2016/0226327 A1 | 8/2016 | Rippel et al. |
| 2016/0301286 A1 | 10/2016 | Salter et al. |
| 2018/0054094 A1 * | 2/2018 | Dlala ...................... H02K 1/14 |
| 2018/0054095 A1 | 2/2018 | Dlala et al. |
| 2019/0157923 A1 | 5/2019 | Morgante et al. |

OTHER PUBLICATIONS

International Search Report and Written Opinion for PCT Application No. PCT/US2021/070526, dated Aug. 2, 2021, 8 pages.
International Search Report and Written Opinion for PCT Application No. PCT/US2021/070527, dated Aug. 3, 2021, 7 pages.

\* cited by examiner

MOTOR COOLING SYSTEM UTILIZING AXIAL COOLANT CHANNELS

FIELD OF THE INVENTION

The present invention relates generally to the electric motor assembly of an electric vehicle and, more particularly, to an efficient motor cooling system that can be used to cool the critical elements of a motor assembly.

BACKGROUND OF THE INVENTION

In response to the demands of consumers who are driven both by ever-escalating fuel prices and the dire consequences of global warming, the automobile industry is slowly starting to embrace the need for ultra-low emission, high efficiency cars. While some within the industry are attempting to achieve these goals by engineering more efficient internal combustion engines, others are incorporating hybrid or all-electric drive trains into their vehicle line-ups. To meet consumer expectations, however, the automobile industry must not only achieve a greener drive train, but must do so while maintaining reasonable levels of performance, range, reliability, safety and cost.

The most common approach to achieving a low emission, high efficiency car is through the use of a hybrid drive train in which an internal combustion engine (ICE) is combined with one or more electric motors. While hybrid vehicles provide improved gas mileage and lower vehicle emissions than a conventional ICE-based vehicle, due to their inclusion of an internal combustion engine they still emit harmful pollution, albeit at a reduced level compared to a conventional vehicle. Additionally, due to the inclusion of both an internal combustion engine and an electric motor(s) with its accompanying battery pack, the drive train of a hybrid vehicle is typically more complex than that of either a conventional ICE-based vehicle or an all-electric vehicle, resulting in increased cost and weight. Accordingly, several vehicle manufacturers are designing vehicles that only utilize an electric motor, or multiple electric motors, thereby eliminating one source of pollution while significantly reducing drive train complexity.

In order to achieve the desired levels of performance and reliability in an electric vehicle, it is critical that the temperature of the traction motor remains within its specified operating range regardless of ambient conditions or how hard the vehicle is being driven. A variety of approaches have been used to try and adequately cool the motor in an electric car. For example, U.S. Pat. No. 6,954,010 discloses a device such as a motor, transformer or inductor that utilizes a stack of laminations, where a plurality of at least partially coincident apertures pass through the stack of laminations and define a plurality of coolant passageways. Manifold members located at opposite ends of the lamination stack are used to couple the coolant passageways to a suitable coolant pump and heat sink. A variety of aperture designs are disclosed, including both same-sized apertures that form straight passageways, and apertures that vary in size, shape and/or position to form non-axial passageways.

U.S. Pat. No. 7,009,317 discloses a motor cooling system that utilizes a cooling jacket. The inner surface of the cooling jacket, which may form an interference fit with the stator, includes a series of grooves. The grooves along with the outer surface of the stator form a cooling duct through which coolant is pumped.

U.S. Pat. No. 7,633,194 discloses a system for cooling the stator lamination stack of an electric motor. The outer periphery of each of the laminations is defined by an array of outwardly projecting pins. A cooling jacket surrounds the stack. The outwardly projecting pins cooperate with the jacket to form a cooling space through which coolant flows.

U.S. Pat. No. 10,128,701 discloses an electric motor cooling system in which a plurality of axial coolant channels is integrated into the stator, preferably within the stator teeth. The axis of each of the axial coolant channels is parallel with the cylindrical axis of the stator. A coolant manifold assembly that is integrated into the stator fluidly couples the coolant channels within the stator to the source of coolant.

While there are a variety of techniques that may be used to cool an electric vehicle's motor, these techniques typically only provide limited heat withdrawal. Accordingly, what is needed is an effective cooling system that may be used with the high power density, compact electric motors that are commonly used in high performance electric vehicles. The present invention provides such a cooling system.

SUMMARY OF THE INVENTION

The present invention provides an electric motor cooling system that is comprised of (i) a stator formed from a plurality of laminations, the stator including a first bulk stator portion and a second bulk stator portion, where each of the plurality of laminations includes a plurality of slots and a plurality of stator teeth with the plurality of stator teeth alternating with the plurality of slots; (ii) a first plurality of bulk axial coolant channels integrated into the first bulk stator portion, where the axis corresponding to each of the first plurality of bulk axial coolant channels is parallel with the cylindrical axis of the stator, and where the first plurality of bulk axial coolant channels terminate at a first coolant exit surface; (iii) a second plurality of bulk axial coolant channels integrated into the second bulk stator portion, where the axis corresponding to each of the second plurality of bulk axial coolant channels is parallel with the stator cylindrical axis, where the second plurality of bulk axial coolant channels terminate at a second coolant exit surface, and where the first coolant exit surface is distal from the second coolant exit surface; (iv) a first outer stator lamination proximate to the first coolant exit surface, the first outer stator lamination including a first plurality of coolant channels that restrict coolant flow through the first coolant exit surface and through the first plurality of bulk axial coolant channels; (v) a second outer stator lamination proximate to the second coolant exit surface, the second outer stator lamination including a second plurality of coolant channels that restrict coolant flow through the second coolant exit surface and through the second plurality of bulk axial coolant channels; (vi) a coolant manifold integrated into the stator and positioned between the first bulk stator portion and the second bulk stator portion, where the coolant manifold fluidly couples the electric motor coolant intake to the first plurality of bulk axial coolant channels and to the second plurality of bulk axial coolant channels; and (vii) a coolant pump that circulates a coolant through the at least one electric motor coolant intake, the coolant manifold, the first plurality of bulk axial coolant channels, and the second plurality of bulk axial coolant channels.

In one aspect, the coolant flowing through the first plurality of bulk axial coolant channels undergoes an increase in coolant velocity upon flowing through the first plurality of coolant channels, and the coolant flowing through the second plurality of bulk axial coolant channels undergoes an increase in coolant velocity upon flowing through the second plurality of coolant channels.

In another aspect, the cross-sectional area corresponding to each of the first plurality of coolant channels is smaller than the cross-sectional area corresponding of each of the first plurality of bulk axial coolant channels. Similarly, the cross-sectional area corresponding to each of the second plurality of coolant channels is smaller than the cross-sectional area corresponding of each of the second of bulk axial coolant channels. Each of the first plurality of coolant channels may completely overlay each of the first plurality of bulk axial coolant channels, and each of the second plurality of coolant channels may completely overlay each of the second plurality of bulk axial coolant channels. Each of the first plurality of coolant channels and each of the second plurality of coolant channels may have a circularly-shaped cross-section.

In another aspect, (i) each of the first plurality of coolant channels partially overlap each of the first plurality of bulk axial coolant channels thereby creating a first plurality of overlap regions, where the cross-sectional area corresponding to each of the first plurality of overlap regions is smaller than the cross-sectional area corresponding to each of the first plurality of bulk axial coolant channels; and (ii) each of the second plurality of coolant channels partially overlap each of the second plurality of bulk axial coolant channels thereby creating a second plurality of overlap regions, where the cross-sectional area corresponding to each of the second plurality of overlap regions is smaller than the cross-sectional area corresponding to each of the second plurality of bulk axial coolant channels.

In another aspect, the first plurality of bulk axial coolant channels is preferably aligned with the second plurality of bulk axial coolant channels.

In another aspect, each of the first plurality of bulk axial coolant channels may be at least partially integrated into each of the plurality of stator teeth corresponding to the first bulk stator portion, and each of the second plurality of bulk axial coolant channels may be at least partially integrated into each of the plurality of stator teeth corresponding to the second bulk stator portion.

In another aspect, each of the first plurality of bulk axial coolant channels and each of the second plurality of bulk axial coolant channels may have a cross-sectional shape selected from the group consisting of circularly-shaped cross-sections, rectangularly-shaped cross-sections, rectangularly-shaped cross-sections with rounded corners, elliptically-shaped cross-sections, triangularly-shaped cross-sections, and triangularly-shaped cross-sections with rounded corners.

In another aspect, the coolant flowing out of the first plurality of coolant channels may flow directly over a first plurality of end windings, and the coolant flowing out of the second plurality of channels may flow directly over a second plurality of end windings.

In another aspect, the coolant pump may circulate the coolant through a heat exchanger.

In another aspect, the coolant may be a non-corrosive and non-electrically conductive oil.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

DESCRIPTION OF THE SPECIFIC EMBODIMENTS

Figure 1:
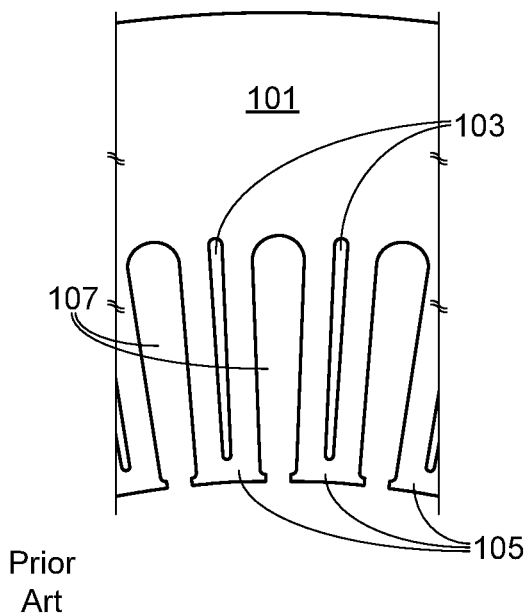
FIG. 1 illustrates a portion of a stator lamination in accordance with the prior art, this view showing the position of a plurality of axial coolant channels integrated into the stator.

As used herein, the singular forms "a", "an" and "the" are intended to include the plural forms as well, unless the context clearly indicates otherwise. The terms "comprises", "comprising", "includes", and/or "including", as used herein, specify the presence of stated features, integers, steps, operations, elements, and/or components, but do not preclude the presence or addition of one or more other features, integers, steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps or calculations, these steps or calculations should not be limited by these terms, rather these terms are only used to distinguish one step or calculation from another. For example, a first calculation could be termed a second calculation, similarly, a first step could be termed a second step, similarly, a first component could be termed a second component, all without departing from the scope of this disclosure.

The motor and cooling systems described and illustrated herein are generally applicable to any high performance electric motor, and particularly applicable to vehicles using electric traction motors, e.g., an electric vehicle (EV). In the following text, the terms "electric vehicle" and "EV" may be used interchangeably and may refer to an all-electric vehicle, a plug-in hybrid vehicle, also referred to as a PHEV, or a hybrid vehicle, also referred to as a HEV, where a hybrid vehicle utilizes multiple sources of propulsion including an electric drive system.

Electric motors typically generate heat both in the laminations due to iron core losses and in bulky conductors due to eddy currents. The majority of the losses, however, are generated in the stator windings due to resistive copper losses. One common approach to removing heat from the stator is through the use of a coolant jacket, for example a water jacket, which is positioned around the stator laminations. Unfortunately this approach permits hot spots to develop as it does not effectively cool the stator end-windings since the jacket is not placed in close enough proximity to the main source of heat, i.e., the stator windings.

One technique that has been proven effective in mitigating the issue of heat generation in the end-parts of the motor is to splash coolant, e.g., oil, on the stator end-windings and rotor end-rings. By combining this technique with a coolant jacket such as that described above, significant temperature drops can be achieved in an operating electric motor. Unfortunately even this combination of cooling systems will still allow hot spots to develop in the middle of the axial direction of the motor where neither the coolant jacket nor the coolant splashed on the motor end-parts are close enough to effectively remove heat from these regions. Additionally, by combining two separate cooling subsystems, e.g., an outer water jacket and an oil system that includes a pump, overall system complexity is dramatically increased, leading to increased manufacturing cost and reduced reliability.

Another technique that significantly lowers motor temperatures, especially within the stator, is the use of thin, axial cooling channels integrated within the stator. FIG. 1 illustrates such an approach, this figure showing a portion of a stator 101. Integrated within stator 101 are the axial coolant channels 103. In this exemplary configuration, the axial coolant channels 103 are located within the stator teeth 105, and positioned between and near slots 107. Since the main heat source in the stator is the winding, locating coolant channels 103 in the teeth provides a very efficient means for removing heat from the motor assembly. Unfortunately upon exiting the axial coolant channels, the coolant undergoes a significant decrease in velocity. As a result of the decreased velocity, the coolant flowing out of coolant channels 103 follows a gravitational flow pattern, thus preferentially cooling the end portions of the stator windings that are below the cooling channels.

Figure 2:
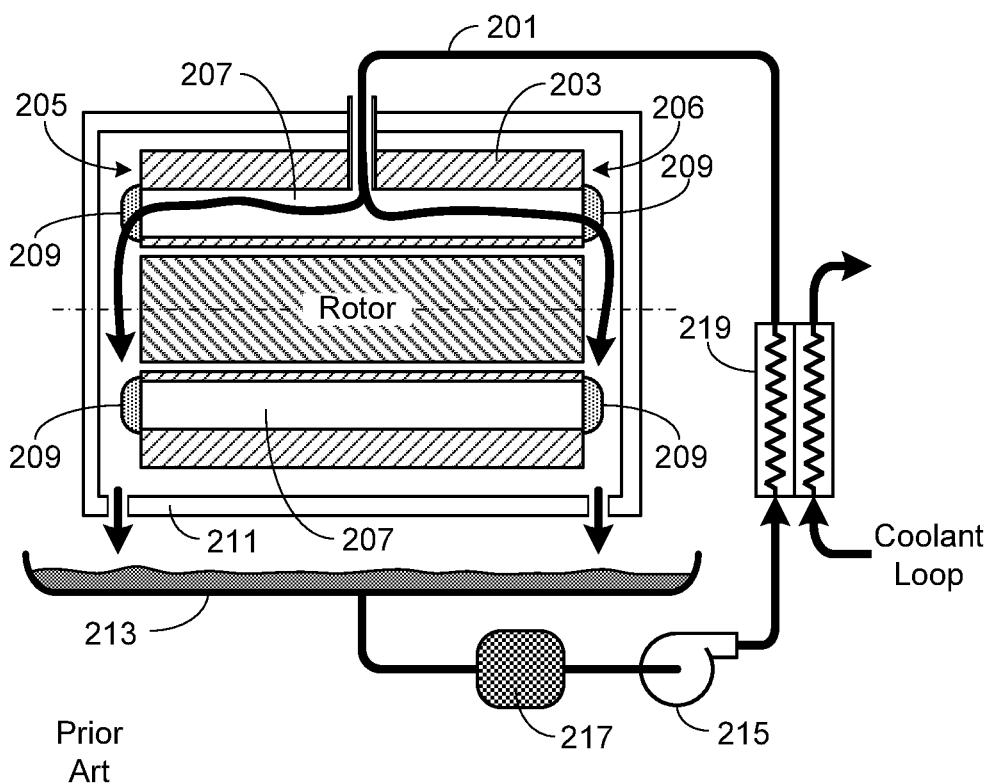
FIG. 2 provides a simplified cross-sectional view of an electric motor utilizing a cooling system as described by the prior art.

FIG. 2 provides a simplified cross-sectional view of an electric motor utilizing a cooling system as described by the prior art. As shown, coolant 201 is pumped into the center, or approximate center, of the lamination stack comprising the stator 203. The coolant flows from the center outward towards both ends 205/206 of the stator via the axial coolant channels 207. As the coolant exits the stator, gravitational flow preferentially directs the coolant over the end portions of the windings 209 that are below the exit apertures of the axial coolant channels 207. The coolant then passes through the motor case 211 and is collected in coolant pan 213. After exiting coolant pan 213, the coolant is pumped back into the stator using pump 215, preferably after passing through a filter 217. A heat exchanger 219 is preferably used to withdraw excess heat from the coolant. As FIG. 2 illustrates, the prior art approach can lead to non-uniform cooling of the end portions of the stator windings, preferentially cooling the lower end winding portions. The non-uniform cooling of the end portions of the stator windings is the result of the coolant velocity undergoing a significant decrease as the coolant exits the ends of the axial coolant channels. Due to this decrease in coolant velocity, the coolant follows a gravitational flow pattern upon exiting the coolant channels. As a result, the coolant exiting the ends of the stator does not uniformly flow over the end portions of all of the windings.

The present invention utilizes stator-integrated axial coolant channels such as those disclosed in co-assigned U.S. Pat. No. 10,128,701, the disclosure of which is incorporated herein for any and all purposes. To overcome the non-uniform cooling noted above, the present invention utilizes stator end laminations that include coolant channels that are in fluid communication with the stator-integrated axial coolant channels, but which are configured to restrict the flow of coolant exiting the coolant channels. As a result of this restriction, the coolant exiting the stator-integrated coolant channels undergoes a velocity increase that directs the flow of coolant out and away from the stator, thereby uniformly impinging on the end portions of the stator windings.

Figure 3:
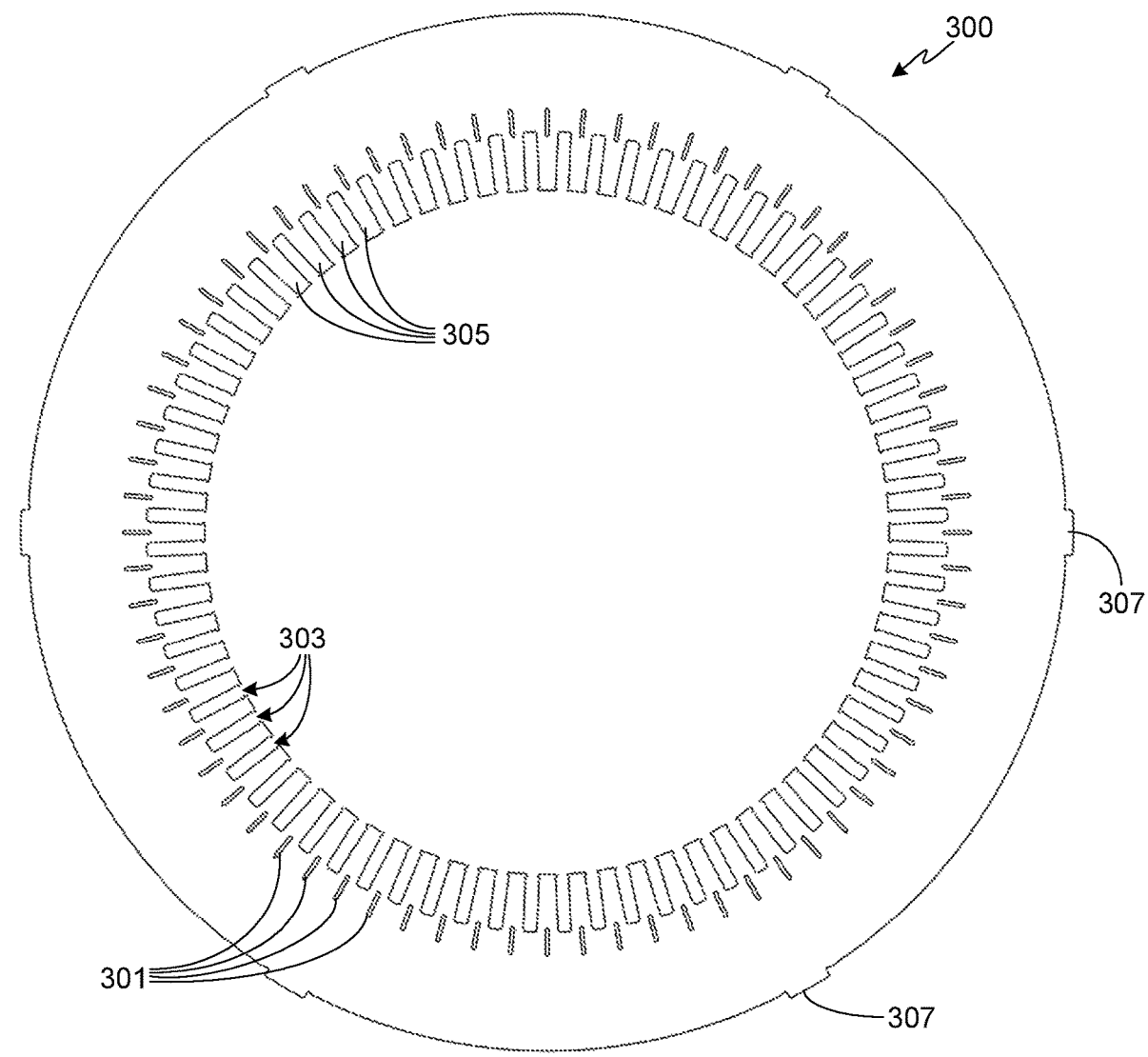
FIG. 3 illustrates a preferred configuration for the axial coolant channels used in the bulk of the stator assembly, this figure providing an end view of a stator lamination.

FIG. 3 illustrates a preferred configuration for the axial coolant channels used in the stator assembly of the invention, this figure providing an end view of a lamination 300. In the illustrated embodiment, axial coolant channels 301 are located between stator slots 303, and preferably partially within the stator teeth 305. Lamination 300 preferably includes one or more features 307, referred to herein as keyways, which are used to simplify alignment of the stack of laminations during stator assembly and ensure that the coolant channels 301 are aligned throughout the stack. In the preferred stator design, six keyways 307 are equidistantly spaced about the perimeter of the lamination stack. In addition to simplifying stack alignment, keyways 307 can also be used during the final assembly process, for example to provide a continuous surface for welding or bonding the stack laminations together.

Figure 4:
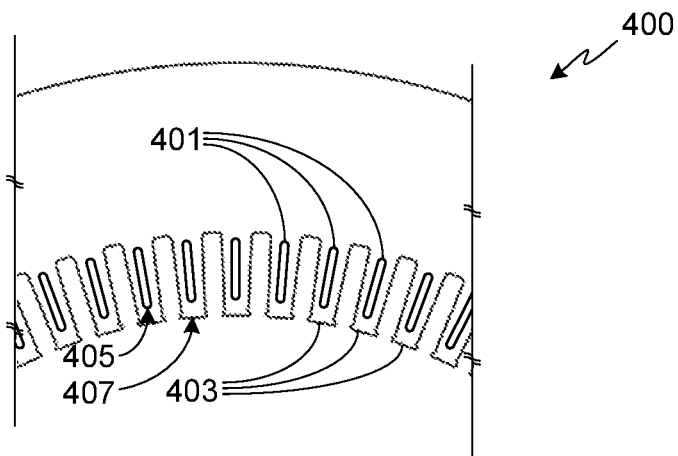
FIG. 4 illustrates a portion of a stator lamination, this view showing axial coolant channels located completely within the stator teeth.
Figure 5:
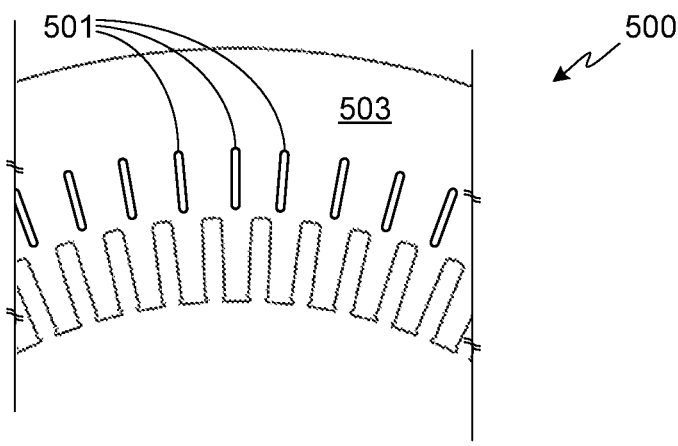
FIG. 5 illustrates a portion of a stator lamination, this view showing axial coolant channels located completely within the stator yoke.
Figure 6:
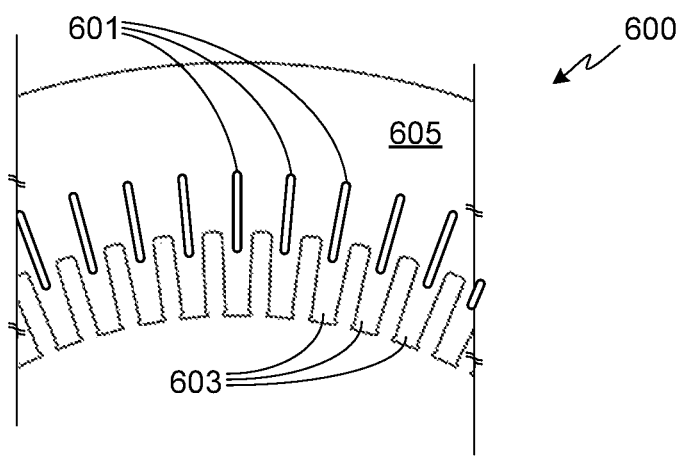
FIG. 6 illustrates a portion of a stator lamination, this view showing axial coolant channels located partially within the stator yoke and partially within the stator teeth.

In general the size, position and shape of the axial coolant channels located within the bulk of the stator, e.g., coolant channels 301, are optimized from electromagnetic, thermal and structural points of view for the particular application (e.g., EV traction motor), motor (e.g., size, output, duty cycle, etc.) and cooling system (e.g., coolant characteristics, heat exchanger characteristics, etc.) in question. The manufacturability of the cooling channels is also taken into account, for example insuring that the dimensions and shape of the cooling channel lends itself to the use of a suitable manufacturing tool. It will be appreciated that the axial cooling channels of the invention can utilize any of a variety of shapes, e.g., generally rectangular, elliptical, triangular, circular, etc. The corners of the generally rectangular and triangular cooling channels may be rounded or not, and if rounded the radius of curvature for the rounded corners may be optimized. Furthermore, the axial coolant channels within the stator may be located within the stator teeth, within the stator yoke, or positioned such that a portion of each coolant channel lies partially within the yoke and partially within the tooth. FIGS. 4-6 illustrate these coolant channels locations. In FIG. 4, a portion 400 of a stator is shown in which axial coolant channels 401 are located within each tooth 403 of the stator. In FIG. 5, a portion 500 of a stator is shown in which axial coolant channels 501 are located completely within stator yoke 503. In FIG. 6, a portion 600 of a stator is shown in which axial coolant channels 601 are located partially within the stator teeth 603, and partially within the stator yoke 605. When the coolant channel is located completely or partially within the stator tooth, the innermost edge (e.g., channel edge 405) of each coolant channel is positioned at a sufficient distance from the inner tooth edge (e.g., tooth edge 407) to ensure the structural integrity of the tooth and in order to maintain a sufficiently low magnetic saturation. While not required, preferably there is a one-to-one correspondence between the stator teeth and the axial coolant channels, thus simplifying manufacturing as well as insuring uniform cooling.

An electric motor heats up with the increase of the mechanical loading that gives rise to the electrical current in the stator windings. The resistive loss, $P_w$, in a stator winding can be approximated by:

$$P_w = (I_{ph}^2)(R_{dc}),$$

where $I_{ph}$ is the phase current and $R_{dc}$ is the DC resistance. $R_{dc}$ is dependent on the cross section and length of the wire used in the windings as well as the resistivity, $\rho$. The resistivity, $\rho$, is dependent upon the temperature, $T$. If the temperature, $T$, does not vary too much, a linear approximation such as that shown below may be used to determine resistivity. Specifically:

$$\rho(T) = \rho_0[1+\alpha(T-T_0)],$$

where $\alpha$ is the temperature coefficient of resistivity, $T_0$ is a fixed reference temperature (usually room temperature), and $\rho_0$ is the resistivity at temperature $T_0$. The parameter $\alpha$ is an empirical parameter fitted from measurement data. In copper, $\alpha$ is 0.003862 $K^{-1}$.

The steel laminations comprising the stator assembly generate magnetic core losses that are dependent on the material properties as well as the flux density and the frequency of the power inverter supply. These losses, along with other motor mechanical and electrical losses, add heat to the system, leading to the rise in temperature in an operating motor.

Preferably the saturation of magnetic flux in the teeth remains at an optimal level so that the electromagnetic torque of the motor is maximized. This goal can be achieved by optimizing the stator slots, e.g., slots 303 in FIG. 3, and the axial coolant channels within the bulk of the stator laminations, e.g., coolant channels 301 in FIG. 3, together. The inventors have found that this optimization typically results in a reduction in slot width, leading to decreased copper and increased stator resistance. As shown below, the incremental increase in stator resistance can be overcome by the drop in temperature, which allows for a drop in the resistance.

From a thermal point of view, the axial coolant channels contained within the bulk of the stator are optimized to minimize the thermal resistance between the coolant-wetted areas of the coolant channels and the coolant inlet section of each channel. For a given amount of heat to be dissipated, a lower thermal resistance results in lower temperatures within the motor. The thermal resistance, $R_{th}$, is related to the wetted area, $A$, and the heat transfer coefficient, $\alpha_{ht}$, through the following equation:

$$R_{th} = 1/(A \cdot \alpha_{ht}).$$

The heat, $Q$, extracted by a single channel can be expressed as:

$$Q = (T_{wall} - T_{inlet})/R_{th},$$

where $T_{wall}$ and $T_{inlet}$ represent the average temperature on the coolant-wetted area of the channel and the average coolant temperature at the inlet section of the cooling channel, respectively. This equation can be rewritten as:

$$Q = A \cdot \alpha_{ht} \cdot (T_{wall} - T_{inlet}).$$

Therefore the key to lowering the temperature inside the motor is to maximize the quantity $A \cdot \alpha_{ht}$, thereby minimizing the thermal resistance. The value of the heat transfer coefficient, $\alpha_{ht}$, is dependent on the heat transfer mechanisms occurring within the coolant, i.e., conduction and convection. Conduction results from the thermal properties of the coolant, specifically the thermal conductivity of the coolant. Given that the coolant flowing through the axial cooling channels is in direct contact with the lamination stack and the copper end-windings, preferably the coolant is neither electrically conductive nor is it corrosive. In at least one embodiment of the invention, motor or transmission oil with a high dielectric strength is used as the coolant.

The convective mechanism of heat extraction depends on the fluid motion regime within the axial coolant channels. Fluid motion within the channels is dependent on the Reynolds number, Re, which represents the ratio between the inertial and viscous forces associated with the flowing coolant and is given by:

$$Re = (\rho \cdot v \cdot D)/\mu,$$

where $\rho$ is the coolant density, $v$ is the average coolant velocity measured on the transverse cross section of the channel, $D$ is the hydraulic diameter and $\mu$ is the coolant dynamic viscosity. For low Reynolds numbers, typically less than 2300, the coolant regime is laminar and the main heat transfer mechanism is conduction. For high Reynolds numbers, typically greater than 4000, the coolant regime is turbulent. In this case the fluctuations occurring within the coolant increase mixing, resulting in additional heat transfer mechanism via convection. The coolant regime is in transition for Reynolds numbers that are greater than 2300 and lower than 4000.

The hydraulic diameter, $D$, is defined as:

$$D = 4(A_{sec}/P_{sec}),$$

where $A_{sec}$ is the cross-section area and $P_{sec}$ is the wetted perimeter of the coolant channel cross-section. As previously noted, in order to lower motor temperature the quantity $A \cdot \alpha_{ht}$ should be maximized, preferably by maximizing both the coolant-wetted area, $A$, and the heat transfer coefficient, $\alpha_{ht}$, which depends on the fluid regime. Expressions for the heat transfer coefficient can be conveniently written in terms of the Nusselt number, Nu, the Prandtl number, Pr, and the ratio between the channel length, L, and hydraulic diameter, D. Typically they take the general non-dimensional form of:

$$Nu=F(Pr,Re,L/D\ldots).$$

The Nusselt and Prandt numbers are defined as:

$$Nu=\alpha_{ht}\cdot(D/k), \text{ and}$$

$$Pr=Cp\cdot(\mu/k),$$

where Cp is the specific heat of the cooling fluid, k is the thermal conductivity of the cooling fluid, and μ is the dynamic viscosity of the cooling fluid.

It is therefore clear from the above that there are numerous factors that impact the specific design of the bulk stator axial coolant channels as applied to a specific motor; these factors include the coolant-wetted area, A, the heat transfer coefficient, $\alpha_{ht}$, the topology and dimension of the channels, and the mass flow rate. In the preferred embodiment of the invention, the bulk stator axial coolant channels have a generally rectangular shape with an aspect ratio between the channel width and height on the order of 1:5. The preferred bulk stator axial coolant channels have dimensions of approximately 0.8 mm by 4 mm.

As noted above, the outermost laminations of the stator lamination stack utilize axial coolant channels that are configured to restrict the flow of coolant passing through the stator. Restricting the flow of coolant out of the stator increases coolant velocity, thereby forming micro-jets of coolant that are expelled from both ends of the stator. In the preferred embodiment, the coolant exiting the stator is directed outward at an approximately 90 degree angle relative to the planar surface of the outermost laminations, thus ensuring that the coolant impinges uniformly on the end windings. The size of the restricted region of the coolant channel, while dependent upon the size of the bulk stator axial coolant channels, is typically in the range of 0.2 mm to 1 mm in diameter, assuming a circularly-shaped region. If the restrictive regions are elliptical or formed in some other, non-circular shape, typically they have an area in the range of 0.03 mm² to 0.8 mm².

Figure 7:
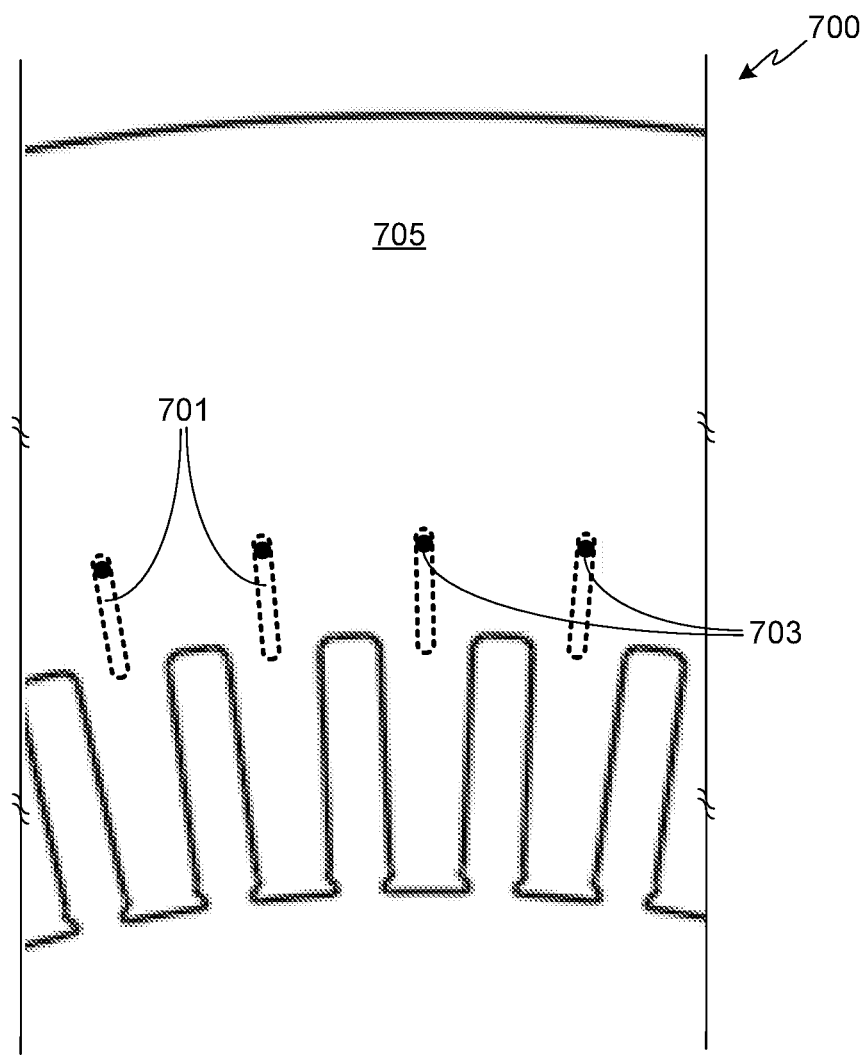
FIG. 7 illustrates a portion of an outer stator lamination, this view showing small coolant channels in the outer lamination overlaying the larger coolant channels located in the underlying laminations.

One approach to restricting the coolant flow exiting the stator is to utilize small apertures as the exit coolant channels, where these small apertures overlap with the underlying axial coolant channels as shown in FIG. 7. FIG. 7 provides an end view of a portion of an exemplary stator assembly 700. The underlying bulk stator axial coolant channels 701 are shown in phantom. Exit apertures 703, i.e., the coolant channels formed in the outer stator lamination 705, directly overlay the underlying bulk stator axial coolant channels 701.

Figure 8:
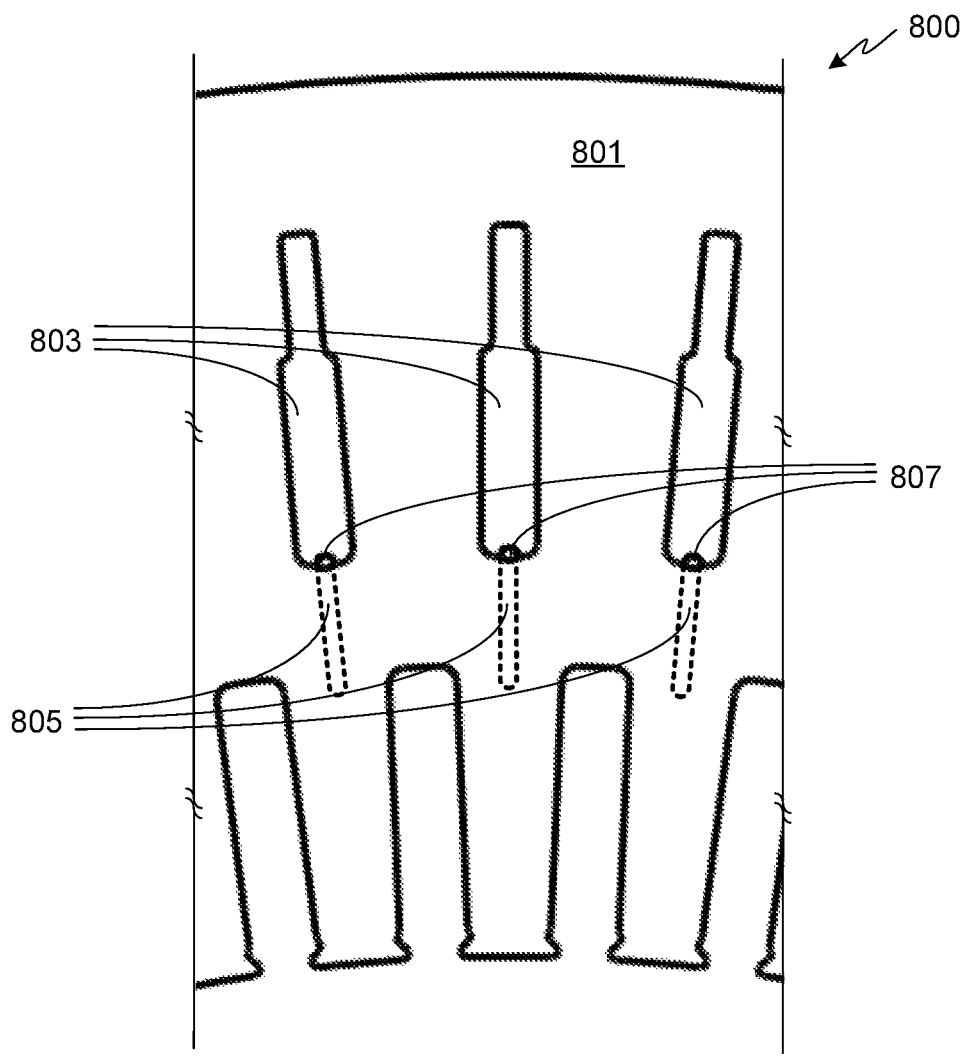
FIG. 8 illustrates a portion of an outer stator lamination, this view showing large coolant channels in the outer lamination overlaying the coolant channels of the underlying laminations with minimal overlap of the two channels.

While the approach of forming small coolant channels in the outermost lamination as illustrated in FIG. 7 is one approach to forming the coolant micro-jets of the invention, this approach is difficult to manufacture due to the small size of the outermost coolant channels, e.g., channels 703. Accordingly, in the preferred embodiment the channels formed in the outermost stator laminations are relatively large, however, these channels are positioned such that they have only a minimal overlap with the underlying coolant channels, thereby forming the desired restrictive channels. FIG. 8, which provides an end view of a portion of an exemplary stator assembly 800, illustrates this approach to forming the coolant micro-jets. The outermost stator lamination 801 includes coolant channels 803. Coolant channels 803, fabricated into the outermost lamination 801, overlap the underlying coolant channels 805, the overlap represented by labels 807. In this figure underlying coolant channels 805 are shown in phantom. As a result of this configuration, the coolant flowing through the bulk of the stator via channels 805 will undergo an increase in velocity as the coolant passes through the restrictive overlap region, i.e., regions 807, thereby creating micro-jets of coolant that are directed out and away from the stator.

Using overlapping coolant channels to create the small restrictive coolant channels as described above relative to FIG. 8 can affect the direction that the coolant is ejected from the stator due to the surface reflections that the coolant undergoes as it flows through the bulk axial coolant channels 805 and off of the affected surfaces of outermost channels 803. As a result of this phenomenon, the direction of the coolant exiting the stator assembly depends, in part, on the thickness of the outermost lamination (e.g., lamination 801 in FIG. 8).

Figure 9:
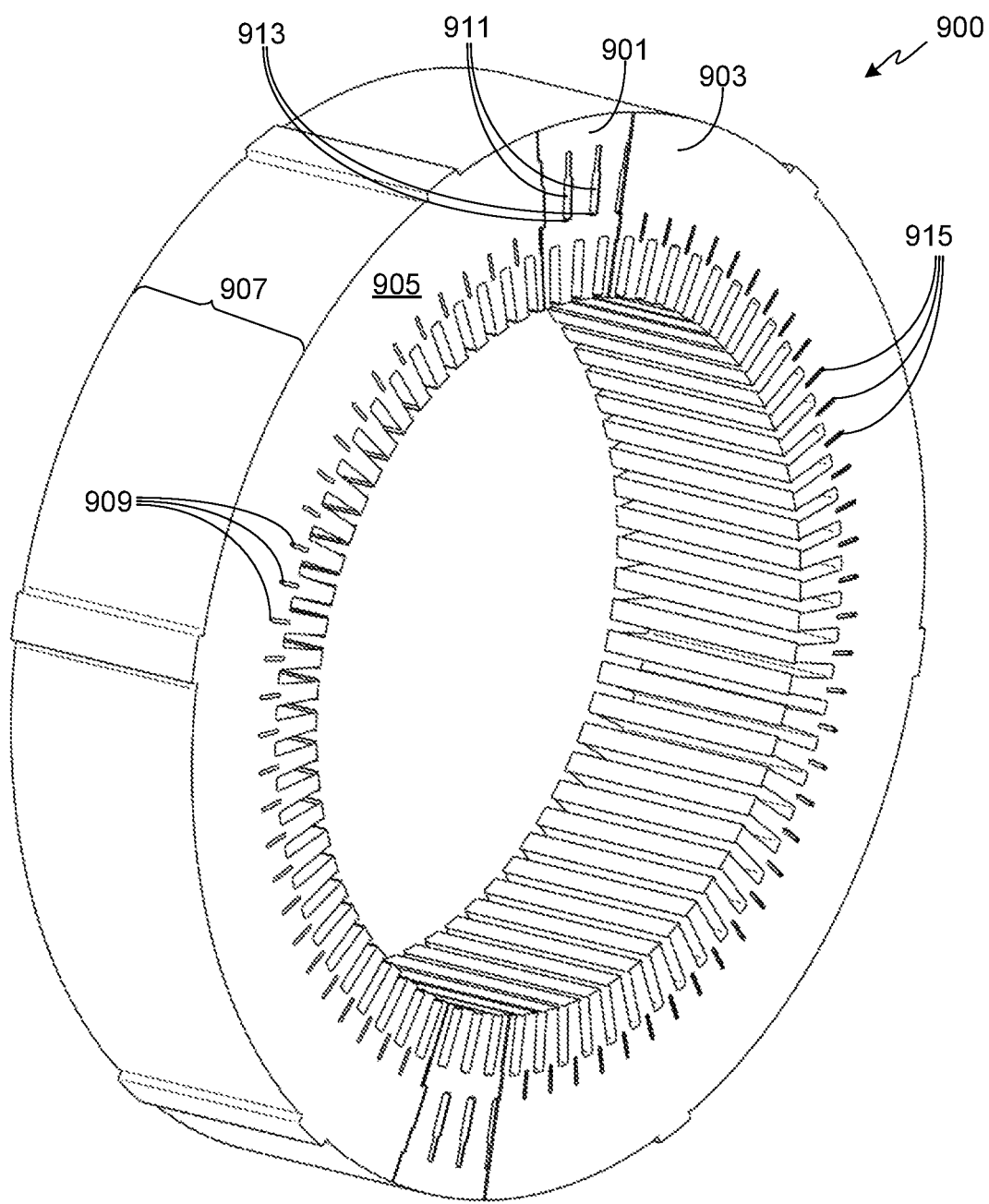
FIG. 9 illustrates a portion of a stator assembly, this view highlighting the overlapping coolant channels used to create the micro-jets of coolant expelled from the stator.
Figure 10:
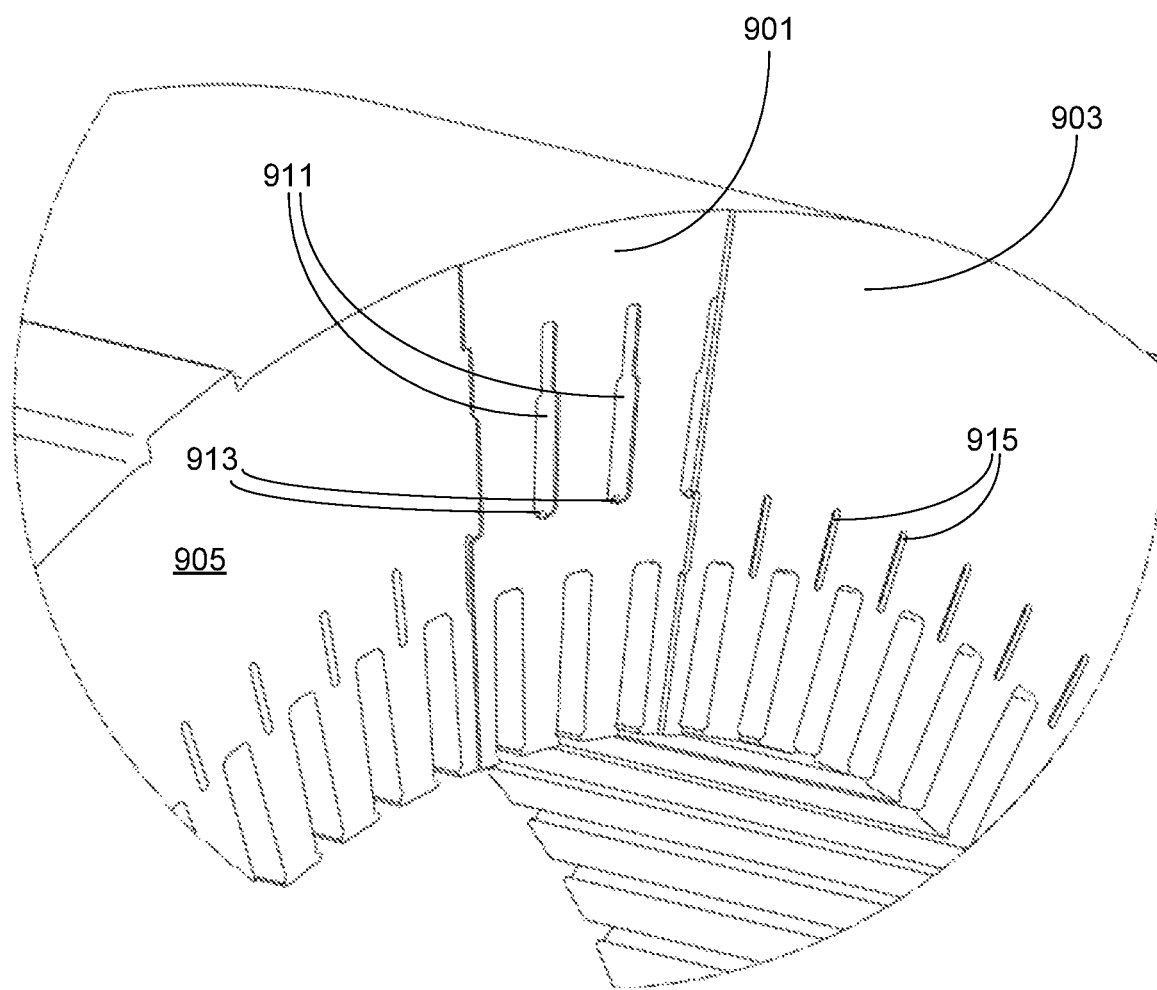
FIG. 10 provides a detailed view of the overlapping coolant channels shown in FIG. 9.

While restricting the flow of coolant as it is expelled from the stator increases the coolant flow velocity, thereby creating coolant micro-jets and overcoming gravitational flow and adhesion forces, it will be appreciated that the direction of coolant flow may or may not be appropriate for a particular motor design depending upon coolant channel locations, lamination thickness of the outermost lamination, etc. Accordingly in at least one embodiment, the inventors have found it desirable to direct the coolant micro-jets in order to effectively cool the stator end windings. In order to direct the flow of coolant from the stator assembly in the desired direction, which in at least one embodiment is in a direction generally perpendicular to the surface plane of the outermost lamination, the inventors have found that the use of two outer laminations is preferred. FIG. 9 provides a perspective view of a stator lamination stack 900 that uses a pair of outer laminations 901 and 903 to both restrict coolant flow and direct the exiting coolant micro-jets to the desired direction. In FIG. 9, only portions of outer laminations 901 and 903 are visible in order to better illustrate the invention. In this embodiment, the stack of laminations 905 comprising portion 907 of the stator, i.e., the bulk of the stator, utilize axial coolant channels 909. Coolant channels 909 utilize the same channel design as channels 301 shown in FIG. 3. The first outer lamination 901, i.e., the lamination that is directly adjacent to the stack of laminations 905, utilizes large coolant channels 911. As described above relative to FIG. 8, coolant channels 911 only overlap underlying channels 909 by a small amount in order to create restrictive channels 913. The second outer lamination 903, i.e., the outermost lamination comprising the stator, includes a plurality of channels 915. In this embodiment, lamination 903 includes the same coolant channel pattern and coolant channel shape/size as the laminations 905 that form the bulk 907 of the stator. As such, channels 915 overlap channels 911. The combination of lamination 901, which restricts coolant flow, and lamination 903, which directs coolant flow, generates a series of micro-jets that are expelled from the end of stator stack 900 in an approximately 90 degree angle relative to the planar surface of lamination 903. FIG. 10 provides a more detailed view of the overlapping coolant channels included in stack 905, first outer lamination 901 and second outer lamination 903.

It should be understood that the use of dual outer laminations as described above relative to FIG. 9 may be accomplished using differently shaped and sized axial coolant channels. However the design provided above also optimizes motor manufacturability by limiting the number of different lamination designs that are required to fabricate the stator, thus optimizing manufacturing, i.e., stamping, efficiency. For example, channels 911 serve dual purposes. The lower portion of channels 911 are designed to overlap stator channels 915 to the degree necessary to restrict the flow of coolant as desired while the upper portion of channels 911 are designed to provide passageways for the coolant to enter the stator channels as described in detail below. Additionally, in this embodiment the same lamination design is used for both the bulk laminations 905 and for the outermost lamination 903, thus allowing this design to also serve dual purposes.

In order to achieve optimal heat removal preferably the coolant (e.g., a non-corrosive, non-electrically conductive oil) is fed into the center of the lamination stack, rather than into one end of the stack. Feeding into the center of the stack allows shorter cooling channels, i.e., left and right portions of the stack rather than extending throughout the entire stack, thus providing higher average heat transfer coefficients and improved cooling. Additionally, feeding into the stack center allows cooling to start in the middle of the stack where heat is trapped and hot spots typically occur.

Figure 11:
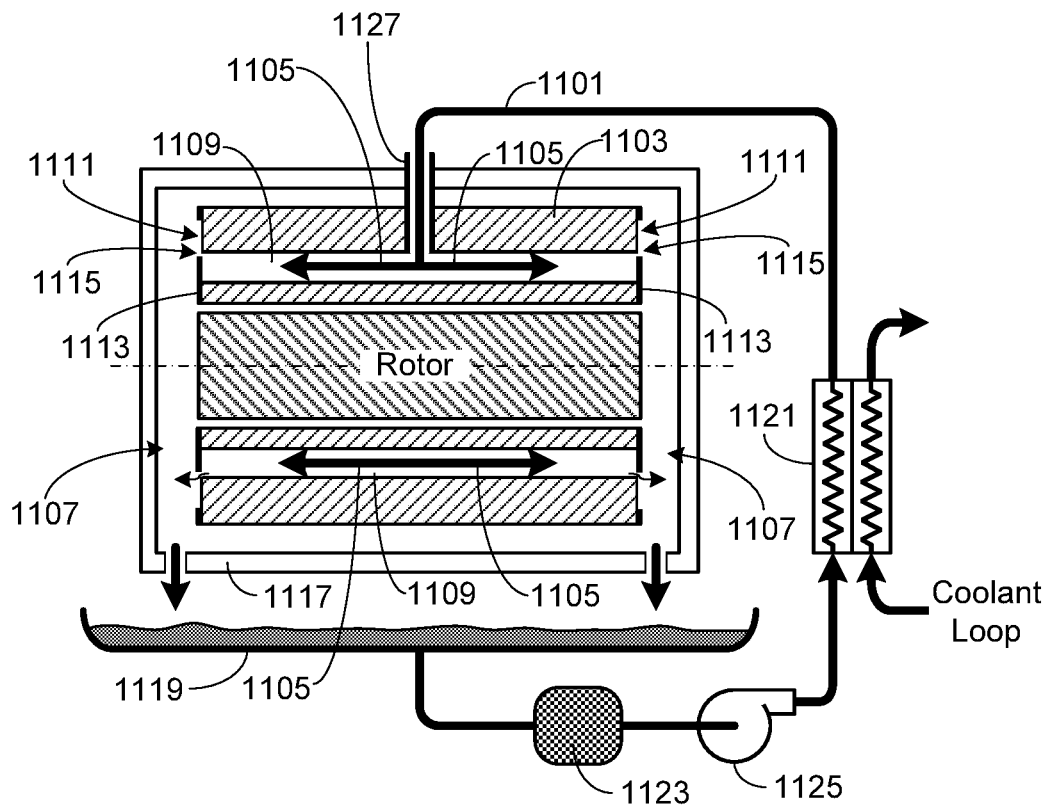
FIG. 11 provides a simplified cross-sectional view of an electric motor utilizing end stator laminations designed to restrict the flow of coolant ejected from the axial coolant channels integrated into the stator.
Figure 12:
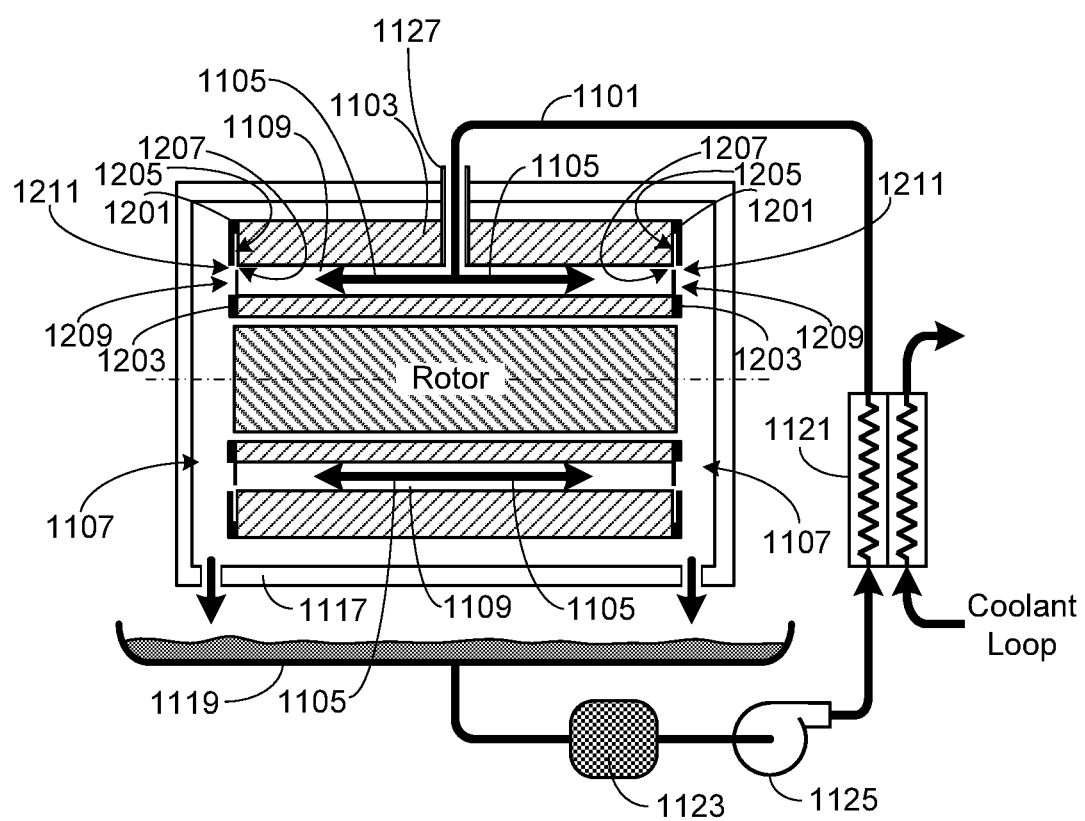
FIG. 12 provides a simplified cross-sectional view of an electric motor utilizing dual end stator laminations designed to restrict and direct the flow of coolant ejected from the axial coolant channels integrated into the stator.

FIGS. 11 and 12 provide simplified cross-sectional views of exemplary electric motors utilizing cooling systems as described herein. The embodiment shown in FIG. 11 uses coolant channels within a single outermost lamination, such as those shown in FIG. 8, to create the coolant micro-jets formed when the coolant is ejected from the axial coolant channels integrated into the stator. The embodiment shown in FIG. 12 uses coolant channels within a pair of outermost laminations, such as those shown in FIGS. 9 and 10, to create and direct the coolant micro-jets formed when the coolant is ejected from the axial coolant channels integrated into the stator.

In FIG. 11, coolant 1101 is pumped into the center, or approximate center, of the lamination stack comprising the stator 1103. The coolant flows from the center outward in directions 1105 towards ends 1107 of the stator via the bulk stator axial coolant channels 1109. In at least one embodiment bulk stator axial coolant channels 1109 are similar to coolant channels 805 shown in FIG. 8. Upon exiting the bulk axial coolant channels 1109, the coolant passes through coolant channels 1111 formed in stator end laminations 1113. As previously noted in describing FIG. 8, due to the minimal overlap between channels 1109 and 1111, i.e., regions 1115, the restriction causes a velocity increase in the coolant ejected from the stator. The increase in ejected coolant velocity overcomes the gravitational flow pattern, thus helping to ensure that the ejected coolant impinges on the stator end windings (not shown for clarity). After cooling the end windings, the coolant passes through the motor case 1117 and is collected in coolant pan 1119. After passing through a heat exchanger 1121, and preferably after passing through a filter 1123, the coolant is pumped back into the stator using pump 1125.

The embodiment shown in FIG. 12 is similar to that shown in FIG. 11, except that this embodiment includes dual outer laminations 1201 and 1203 as described above relative to FIGS. 9 and 10. As in the prior embodiment, the coolant 1101 exiting from the bulk stator axial coolant channels 1109 first pass through coolant channels 1205 formed in stator end laminations 1201, where laminations 1201 and channels 1205 are similar to, or the same as, laminations 1113 and channels 1111. Due to the minimal overlap between channels 1109 and 1205, i.e., regions 1207, the restriction causes a velocity increase in the coolant ejected from the stator. Next the coolant passes through channels 1209 included in second end laminations 1203. Preferably channels 1209 are identical to channels 1109 used in the bulk laminations. As described above, there is minimal overlap, i.e., regions 1211, between channels 1209 fabricated into end laminations 1203 and channels 1205 fabricated into end laminations 1201. Channels 1209 in end laminations 1203 direct the flow of the micro-jets created by channels 1205 in the first end laminations 1201. The combination of the two channels 1205 and 1209 in the dual outer laminations 1201/1203 both generate and direct the coolant micro-jets which impinge on the end windings. As in the prior embodiment, in this preferred embodiment after cooling the end windings, coolant 1101 passes through the motor case 1117, is collected in coolant pan 1119, passes through filter 1123, and is pumped by pump 1125 through heat exchanger 1121.

Figure 13:
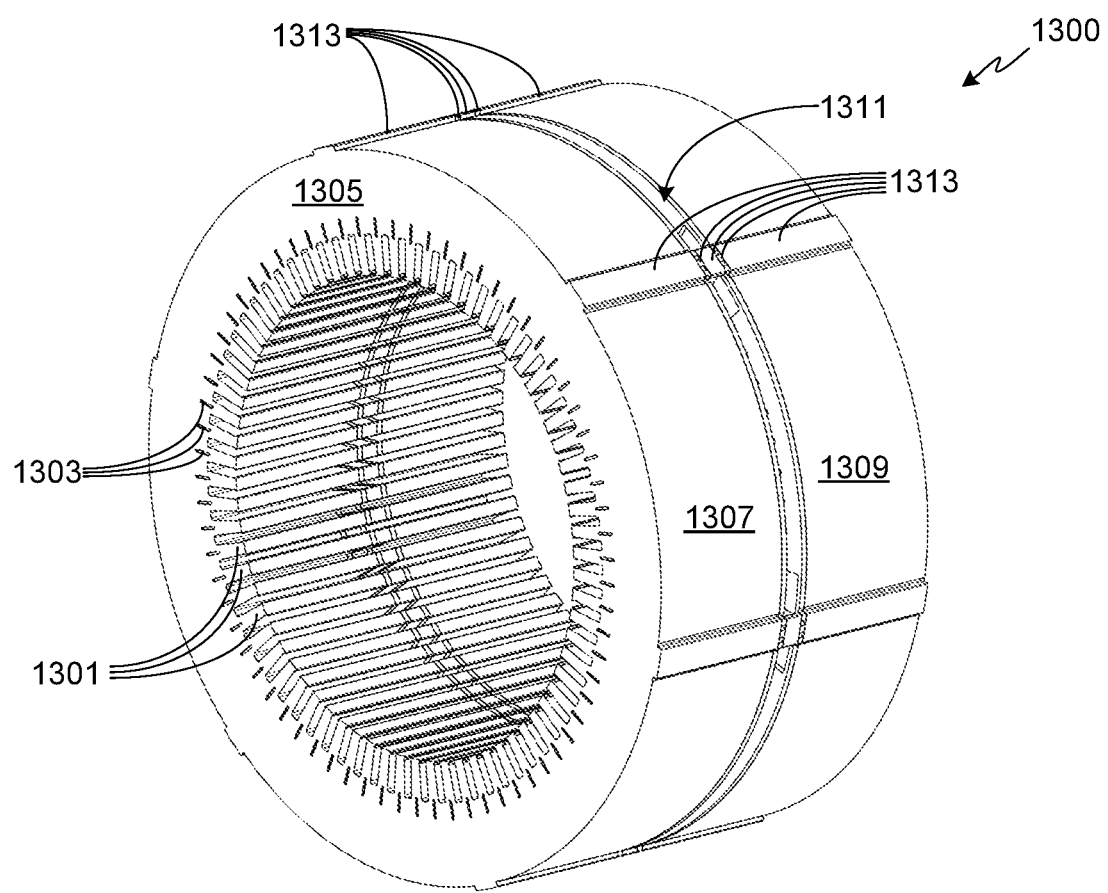
FIG. 13 provides a perspective view of a lamination stack comprising a stator such as the stator assembly shown in FIG. 12.

FIG. 13 provides a perspective view of a lamination stack 1300, such as the lamination stack shown in FIG. 12, this assembly including the dual outer laminations such as those described above relative to FIGS. 9 and 10. It will be appreciated that in this simplified view the individual laminates comprising the lamination stack are not individually visible. Additionally the stator windings are not shown in this figure, thus allowing a better view of the individual stator teeth 1301. It should be understood that since this view does not include a cut-away of the outermost laminations, the bulk axial coolant channels, e.g., coolant channels 909 in FIG. 9, are not visible. In this figure only the channels 1303 fabricated into the outermost lamination 1305 are visible. It will be appreciated that the design and manufacture of the stator, with the exception of the axial cooling channels in the bulk and the outer laminations as well as the coolant manifold design described herein, is well known and therefore a detailed description will not be provided. Additionally, it should be understood that the coolant manifold described below and illustrated in FIG. 13 is equally applicable to a stator assembly utilizing a single micro-jet forming outer lamination such as the designs shown in FIGS. 7 and 8 and described above.

In general, stator assembly 1300 is comprised of a stack of plates, typically referred to as laminations, where each plate is electrically insulated from the adjacent plate(s). The plates are normally stamped or otherwise fabricated from a single sheet of material (e.g., steel). To achieve electrical isolation, both surfaces of each plate are coated with an electrically insulating layer. The electrically insulating coating may be applied before or after the fabrication of the plate, e.g., before or after stamping. Since each plate includes one or more layers of an electrically insulating material, after coating the plate is generally referred to as a laminate or lamination, and the stack of plates is generally referred to as a lamination stack. After stack assembly, the windings are disposed about the stator teeth.

Incorporated into the stator, and located between the left portion 1307 and the right portion 1309 of the lamination stack, is a coolant manifold 1311. The coolant manifold 1311 is coupled to the stator coolant intake, e.g., coolant intake 1127 shown in FIGS. 11 and 12. The coolant is pumped through intake 1127 and into manifold 1311, the manifold then distributing the coolant to all of the bulk axial coolant channels which are not visible in this figure, but are similar to or the same as coolant channels 301 shown in FIG. 3. By locating the manifold at or near the center of the stator, the coolant is pumped outwardly from the stator center to both ends of the stator assembly. Manifold 1311 is coupled to, and sealed to, intake 1127 such that the coolant that is pumped through intake 1127 flows about the entire perimeter of manifold 1311. By sealing the intake to the manifold, the coolant is forced through the manifold into all of the bulk axial cooling channels.

In the preferred stator design, each of the laminations comprising the stator assembly includes at least one keyway 1313. More preferably, and as shown, each of the stator laminations includes a plurality of keyways equidistantly spaced about the perimeter of the laminations. Keyways 1313 serve multiple purposes. First, the keyways 1313 allow the stator laminations to be easily assembled while maintaining the alignment of the axial coolant channels in order to ensure that the coolant flows uninterrupted through the channels. Second, keyways 1313 improve the rigidity of the entire lamination stack 1300. Third, keyways 1313 provide a convenient region for welding or bonding the stack together.

Figure 14:
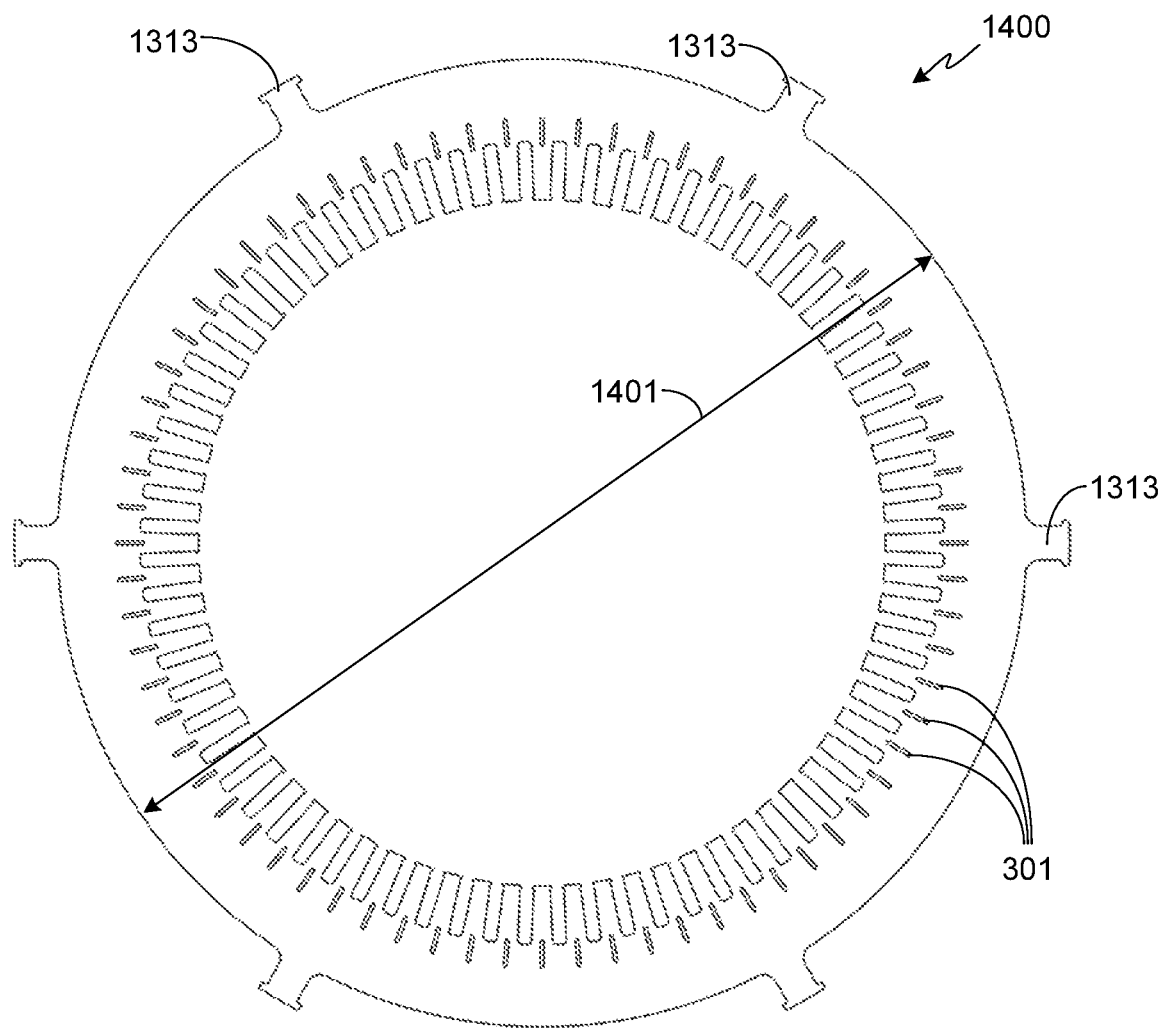
FIG. 14 provides an end view of the middle manifold member in accordance with the invention.
Figure 15:
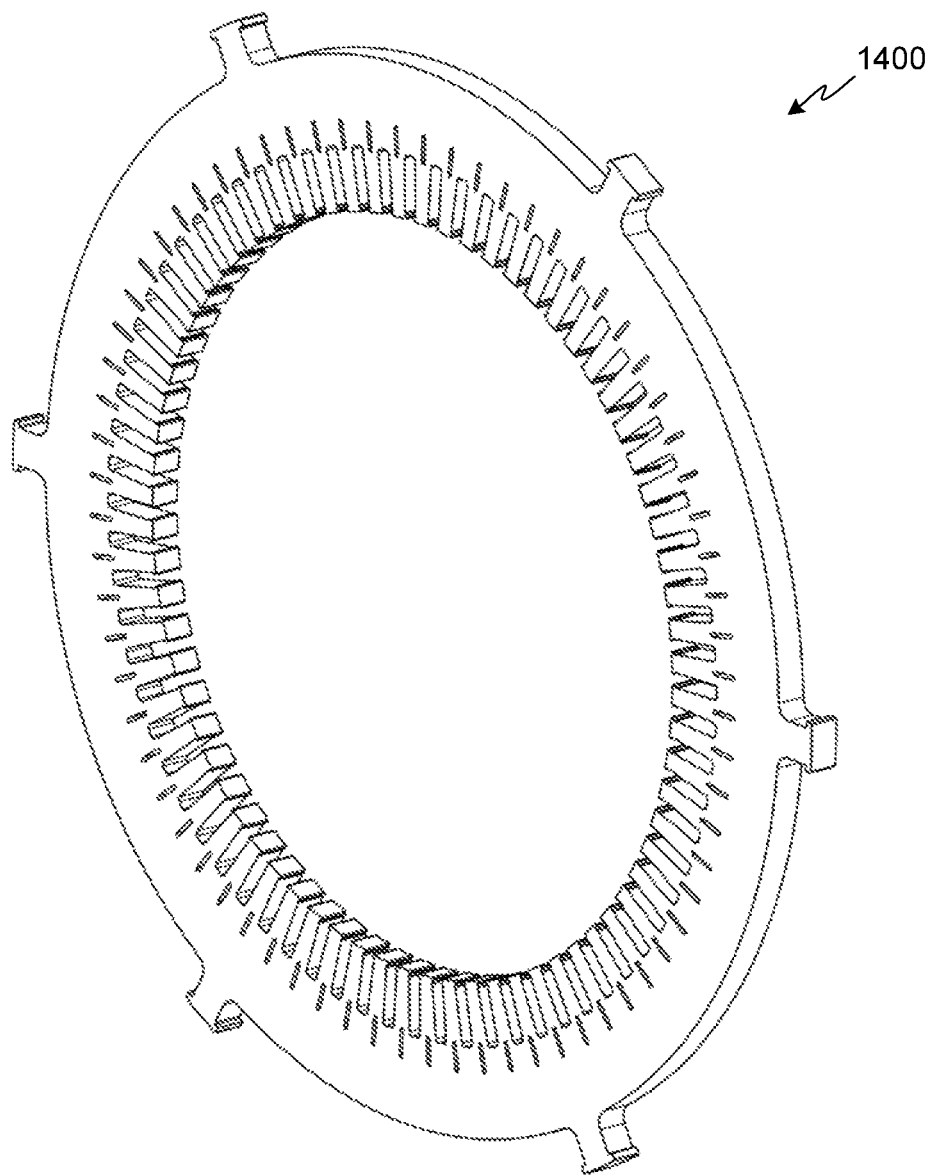
FIG. 15 provides a perspective view of the middle manifold member shown in FIG. 14.

FIGS. 14 and 15 provide end and perspective views, respectively, of the middle manifold member 1400 that is located in the center, or approximate center, of manifold 1311. Middle manifold member 1400 is preferably comprised of multiple individual, identical, laminations. The outer diameter 1401 of member 1400 is smaller than the outside diameter of the remaining stator laminations. Preferably member 1400 does, however, include keyways 1313. Although not required, preferably member 1400 also includes the same pattern of bulk axial coolant channels, e.g., channels 301, as used throughout the stator. The axial coolant channels included in the middle manifold member 1400 ensure that this member does not develop hot spots.

Figure 16:
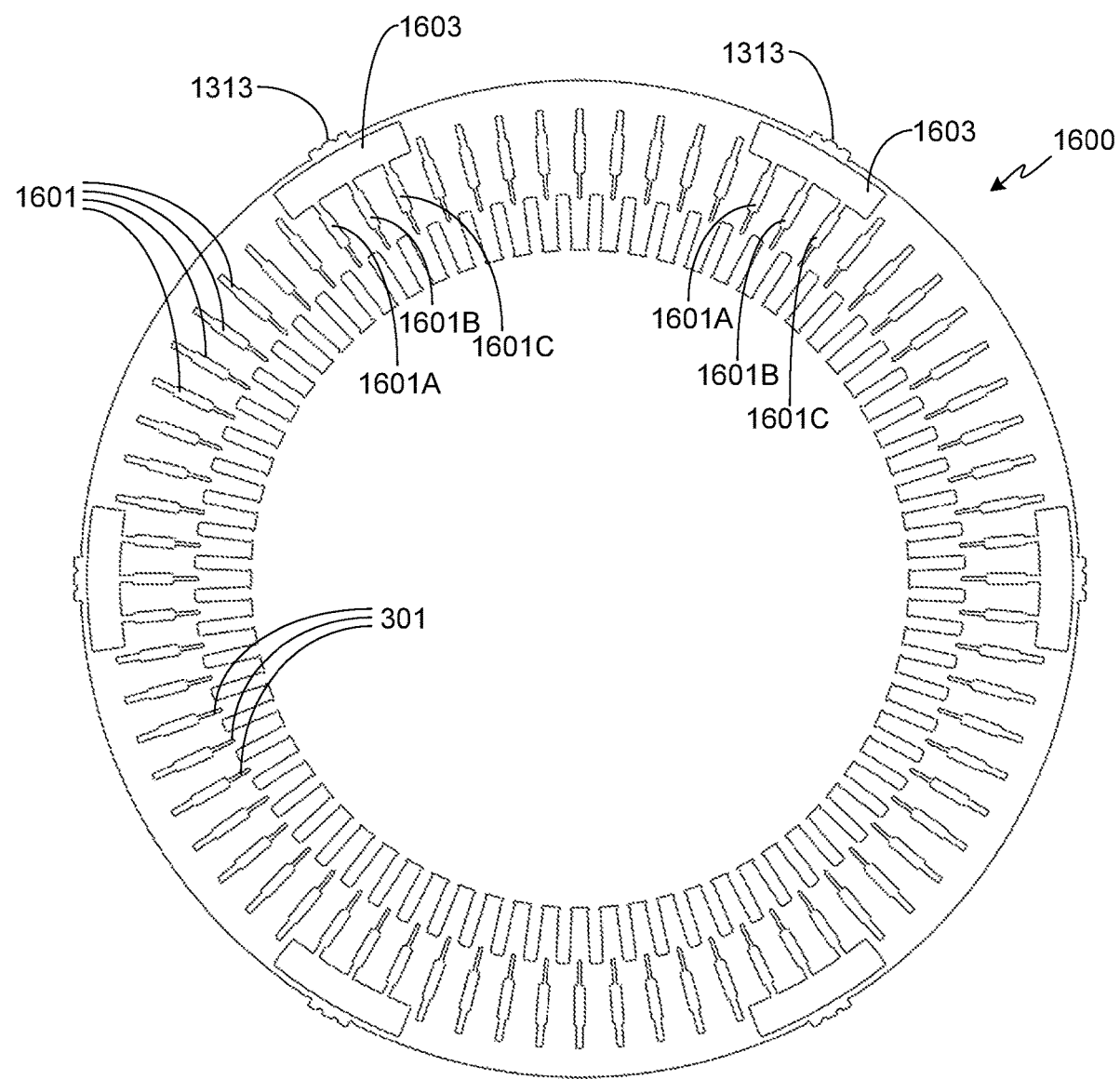
FIG. 16 provides an end view of a transition lamination member in accordance with the invention.
Figure 17:
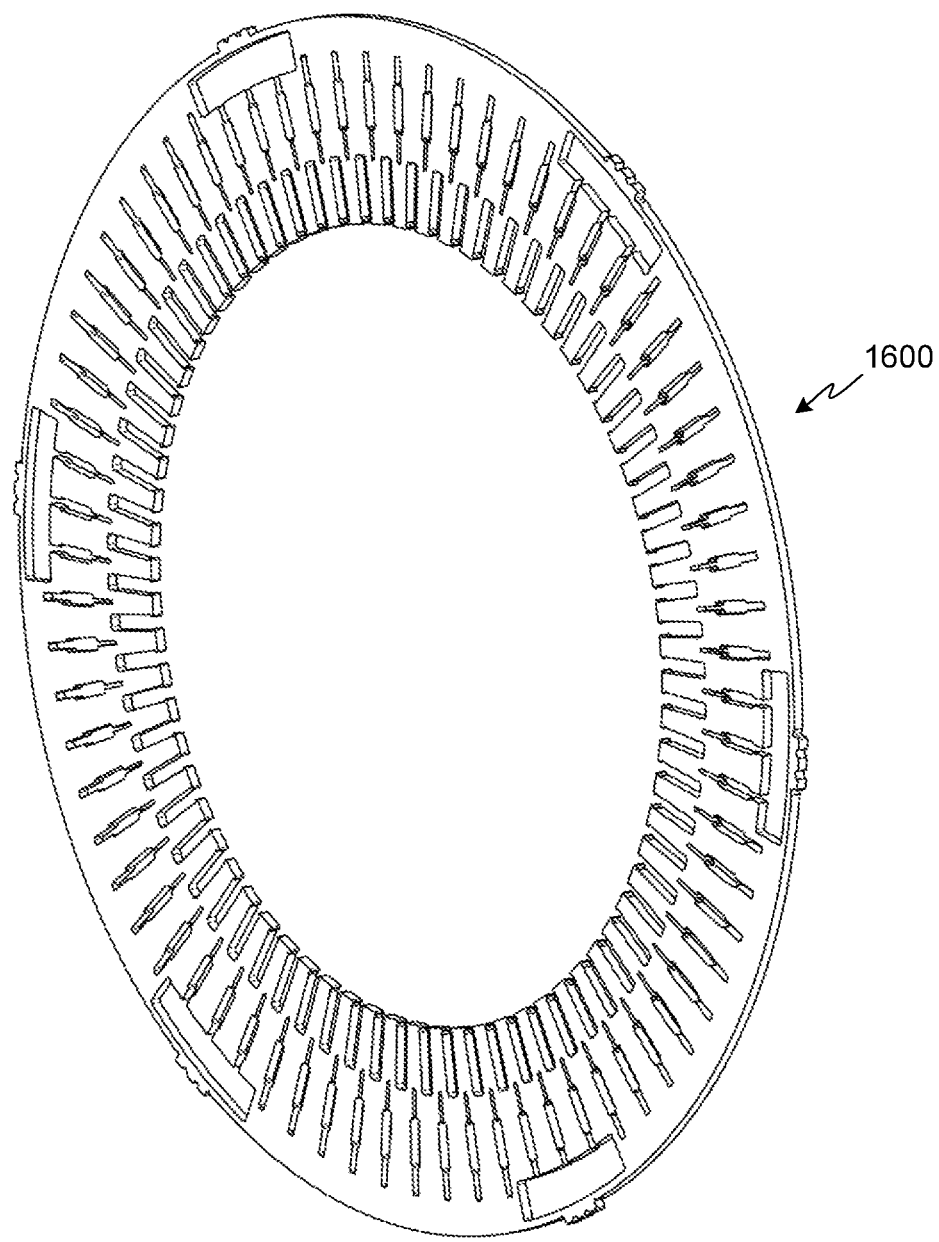
FIG. 17 provides a perspective view of the transition lamination member shown in FIG. 16.
Figure 18:
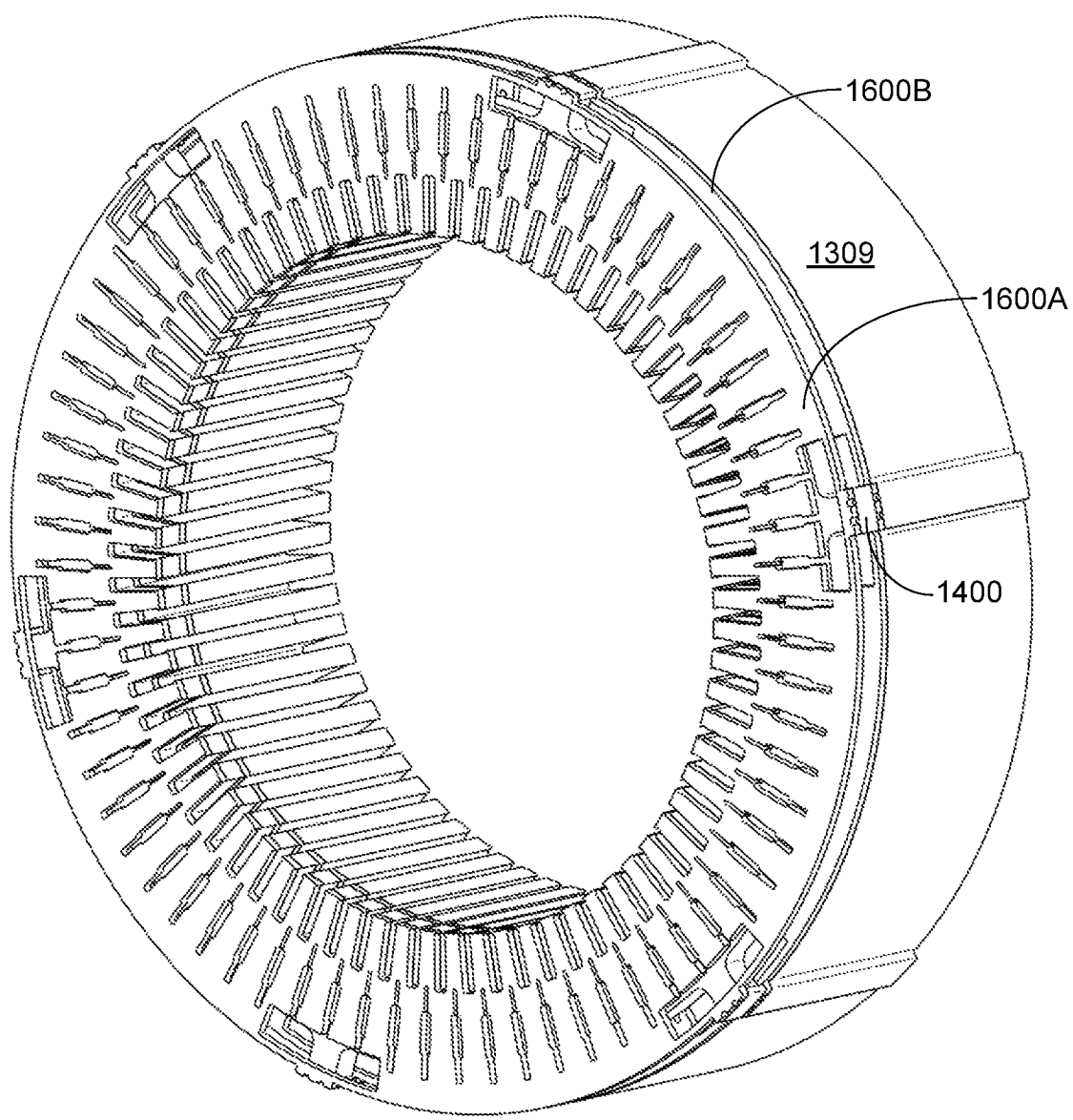
FIG. 18 provides a perspective view of a portion of a lamination stack, this view showing the middle manifold member, left and right transition lamination members, and a portion of the bulk lamination stack.
Figure 19:
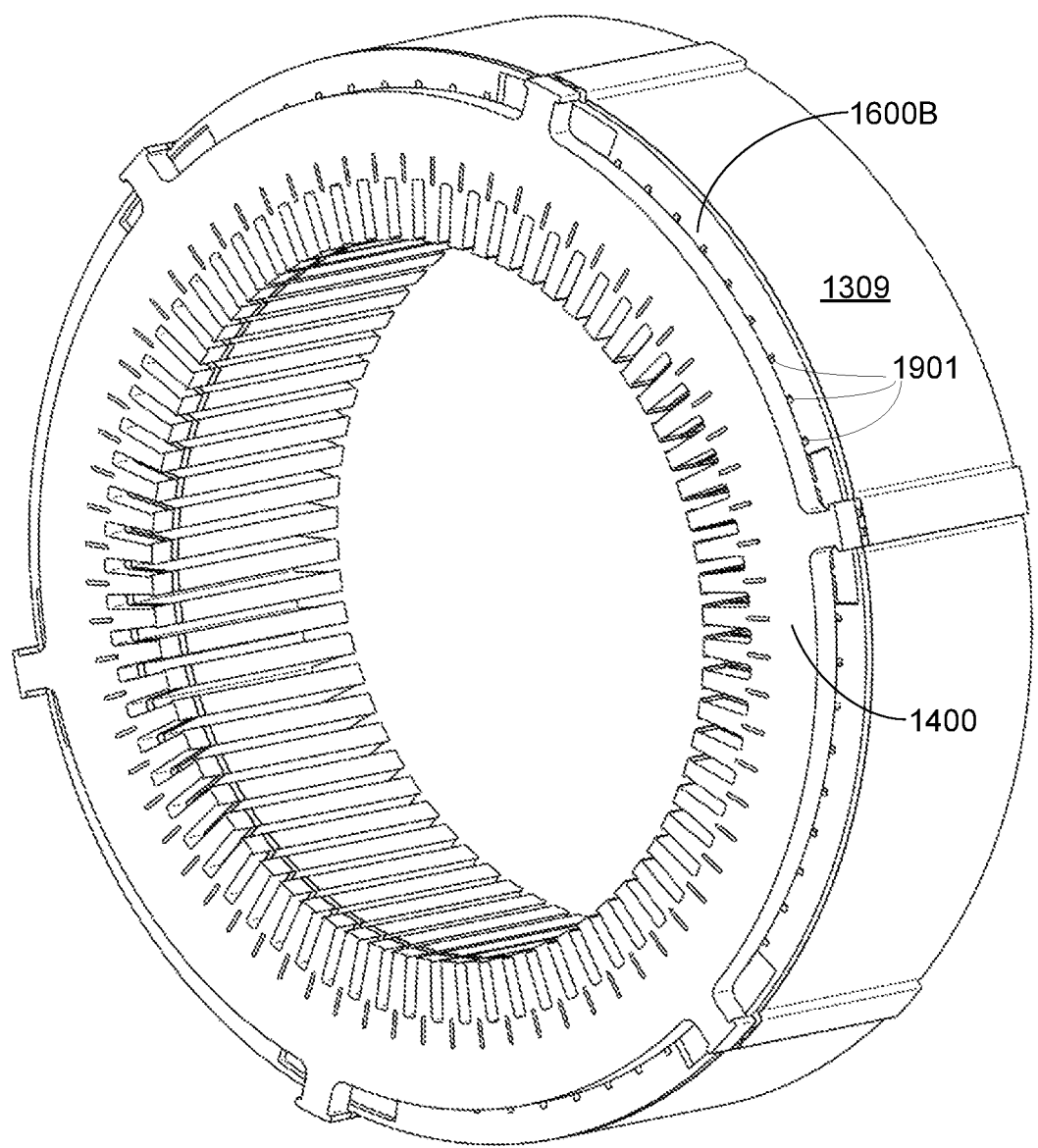
FIG. 19 provides the same view as that provided by FIG. 18 except for the removal of the left transition lamination member.
Figure 20:
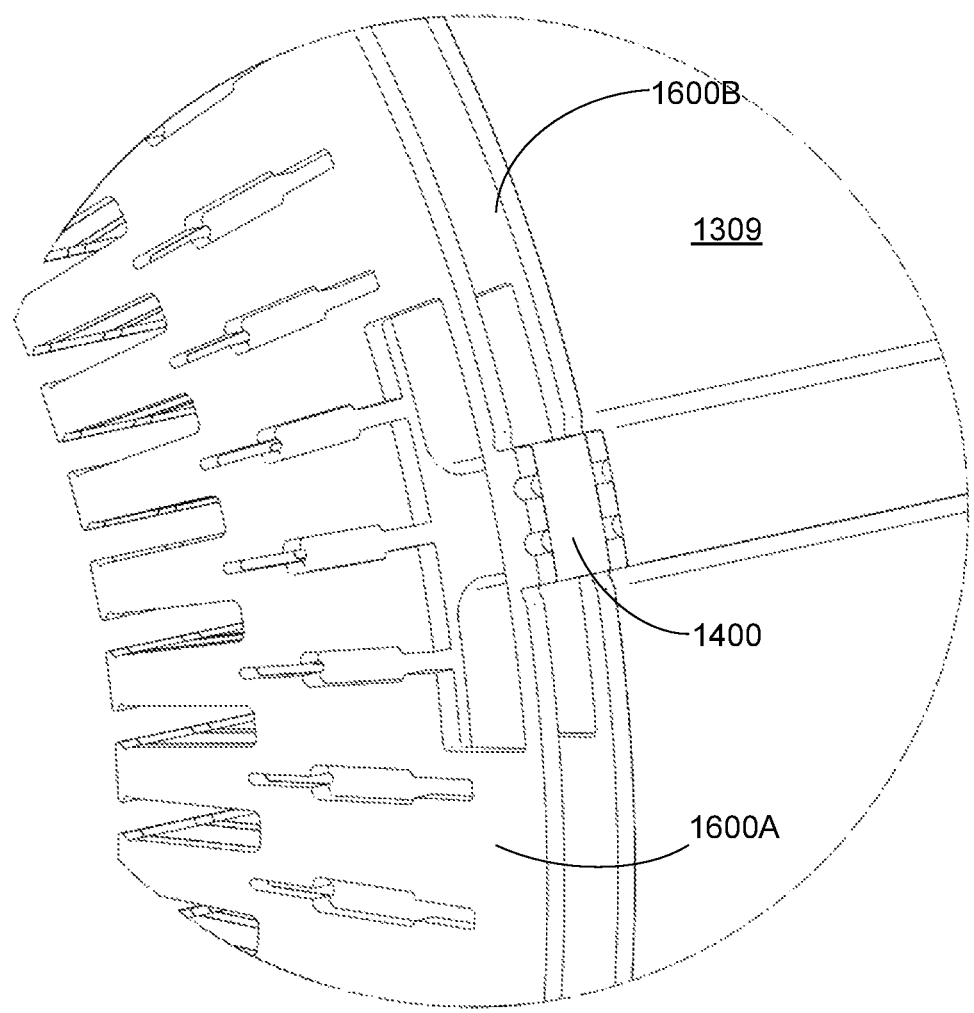
FIG. 20 provides a detailed perspective view of a portion of the lamination stack shown in FIG. 18.

FIGS. 16 and 17 provide end and perspective views, respectively, of the transition members 1600 that are located on either side of the middle manifold member 1400. FIG. 18 provides a perspective view of a portion of lamination stack 1300, this view showing right lamination portion 1309, middle manifold member 1400, and left and right transition lamination members 1600A and 1600B, respectively. FIG. 19 provides the same view as that provided by FIG. 18 except for the removal of left transition lamination member 1600A. FIG. 20 provides a detailed perspective view of a portion of the lamination stack shown in FIG. 18.

Transition lamination members 1600A and 1600B include the same pattern and configuration of axial coolant channels 301 as used in the bulk left and right lamination stack portions 1307 and 1309. Channels 301 are in fluid communication with coolant distribution channels 1601, i.e., there is no barrier between channels 301 and channels 1601. As shown in FIG. 19, a portion 1901 of each coolant distribution channel 1601 extends beyond the perimeter of middle manifold member 1400. As a result of this design, coolant flowing into manifold 1311 flows into the distribution channels 1601 via portions 1901, and then into axial coolant channels 301.

Due to the inclusion of keyways 1311 on middle manifold member 1400, preferably the transition lamination members include coolant cut-outs 1603 that ensure that the coolant distribution channels 1601A-1601C in that region of the member receive coolant. Therefore cut-outs 1603 are configured to ensure that the keyways 1313 fabricated into the middle manifold member 1400 do not interfere with the flow of coolant into the coolant distribution channels fabricated into the transition lamination members, and thus do not interfere with the flow of coolant into the axial coolant channels 301. Cut-outs 1603 also allow the transition members to maintain a continuous, uninterrupted outer perimeter which include keyways 1313.

Middle manifold member 1400 as well as the transition lamination members 1600 are preferably fabricated using the same process, e.g., stamping, as the lamination members used throughout the lamination stack.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. An electric motor cooling system, comprising:
a stator comprising a plurality of laminations, said stator comprising a first bulk stator portion and a second bulk stator portion, wherein each of said plurality of laminations includes a plurality of slots and a plurality of stator teeth, wherein said plurality of stator teeth alternate with said plurality of slots;
a first plurality of bulk axial coolant channels integrated into said first bulk stator portion, wherein an axis corresponding to each of said first plurality of bulk axial coolant channels is parallel with a cylindrical axis corresponding to said stator, and wherein said first plurality of bulk axial coolant channels terminate at a first coolant exit surface corresponding to said first bulk stator portion;
a second plurality of bulk axial coolant channels integrated into said second bulk stator portion, wherein an axis corresponding to each of said second plurality of bulk axial coolant channels is parallel with said cylindrical axis corresponding to said stator, wherein said second plurality of bulk axial coolant channels terminate at a second coolant exit surface corresponding to said second bulk stator portion, and wherein said first coolant exit surface is distal from said second coolant exit surface;
a first outer stator lamination proximate to said first coolant exit surface, said first outer stator lamination being different from an outer lamination of the first bulk stator portion and comprising a first plurality of coolant channels, said first plurality of coolant channels restricting coolant flow through said first coolant exit surface and through said first plurality of bulk axial coolant channels;
a second outer stator lamination proximate to said second coolant exit surface, said second outer stator lamination being different from an outer lamination of the second bulk stator portion and comprising a second plurality of coolant channels, said second plurality of coolant channels restricting coolant flow through said second coolant exit surface and through said second plurality of bulk axial coolant channels;
a coolant manifold integrated into said stator and positioned between said first bulk stator portion and said second bulk stator portion, wherein said coolant manifold fluidly couples an electric motor coolant intake to said first plurality of bulk axial coolant channels and to said second plurality of bulk axial coolant channels; and
a coolant pump, wherein said coolant pump circulates a coolant through said electric motor coolant intake, said coolant manifold, said first plurality of bulk axial coolant channels, and said second plurality of bulk axial coolant channels.

2. The electric motor cooling system of claim 1, wherein:
a first cross-sectional area corresponding to each of said first plurality of coolant channels is smaller than a second cross-sectional area corresponding to each of said first plurality of bulk axial coolant channels; and
a third cross-sectional area corresponding to each of said second plurality of coolant channels is smaller than a fourth cross-sectional area corresponding to each of said second plurality of bulk axial coolant channels.

3. The electric motor cooling system of claim 2, wherein:
each of said first plurality of coolant channels completely overlays each of said first plurality of bulk axial coolant channels; and
each of said second plurality of coolant channels completely overlays each of said second plurality of bulk axial coolant channels.

4. The electric motor cooling system of claim 3, wherein each of said first plurality of coolant channels and each of said second plurality of coolant channels has a circularly-shaped cross-section.

5. The electric motor cooling system of claim 1, wherein:
each of said first plurality of coolant channels partially overlaps each of said first plurality of bulk axial coolant channels to create a first plurality of overlap regions; and
each of said second plurality of coolant channels partially overlaps each of said second plurality of bulk axial coolant channels to create a second plurality of overlap regions.

6. The electric motor cooling system of claim 5, wherein:
a first cross-sectional area corresponding to each of said first plurality of overlap regions is smaller than a second cross-sectional area corresponding to each of said first plurality of bulk axial coolant channels; and
a third cross-sectional area corresponding to each of said second plurality of overlap regions is smaller than a fourth cross-sectional area corresponding to each of said second plurality of bulk axial coolant channels.

7. The electric motor cooling system of claim 5, wherein:
the first plurality of overlap regions are located at a top of the first plurality of bulk axial coolant channels in a radial direction from the cylindrical axis; and
the second plurality of overlap regions are located at a top of the second plurality of bulk axial coolant channels in the radial direction from the cylindrical axis.

8. The electric motor cooling system of claim 1, wherein said coolant flowing through said first plurality of bulk axial coolant channels undergoes an increase in coolant velocity upon flowing through said first plurality of coolant channels, and wherein said coolant flowing through said second plurality of bulk axial coolant channels undergoes an increase in coolant velocity upon flowing through said second plurality of coolant channels.

9. The electric motor cooling system of claim 1, wherein said first plurality of bulk axial coolant channels is aligned with said second plurality of bulk axial coolant channels.

10. The electric motor cooling system of claim 1, wherein each of said first plurality of bulk axial coolant channels is at least partially integrated into each of said plurality of stator teeth corresponding to said first bulk stator portion, and wherein each of said second plurality of bulk axial coolant channels is at least partially integrated into each of said plurality of stator teeth corresponding to said second bulk stator portion.

11. The electric motor cooling system of claim 1, wherein each of said first plurality of bulk axial coolant channels and each of said second plurality of bulk axial coolant channels has a cross-sectional shape selected from the group consisting of circularly-shaped cross-sections, rectangularly-shaped cross-sections, rectangularly-shaped cross-sections with rounded corners, elliptically-shaped cross-sections, triangularly-shaped cross-sections, and triangularly-shaped cross-sections with rounded corners.

12. The electric motor cooling system of claim 1, wherein said coolant flowing out of said first plurality of coolant channels flows directly over a first plurality of end windings, and wherein said coolant flowing out of said second plurality of channels flows directly over a second plurality of end windings.

13. The electric motor cooling system of claim 1, wherein said coolant pump circulates said coolant through a heat exchanger.

14. The electric motor cooling system of claim 1, said coolant comprising an oil, wherein said oil is non-corrosive and non-electrically conductive.

* * * * *